United States Patent [19]

Gillott et al.

[11] Patent Number: 5,154,206
[45] Date of Patent: Oct. 13, 1992

[54] VIBRATION DAMPER

[75] Inventors: Michael A. Gillott, Somers; Kenneth F. Vosseller, Enfield; Robert Sherman, West Hartford; Kenneth P. Hansen, Somers, all of Conn.

[73] Assignee: United Technologies Corporation, Hartford, Conn.

[21] Appl. No.: 280,064

[22] Filed: Dec. 1, 1988

[51] Int. Cl.$^5$ ............................................. F16K 39/00
[52] U.S. Cl. ............................. 137/554; 251/129.04; 74/409; 74/469
[58] Field of Search ........................... 137/625.69, 554; 251/129.04, 337; 123/357; 74/409, 469

[56] References Cited

U.S. PATENT DOCUMENTS

| | | | |
|---|---|---|---|
| 2,005,089 | 6/1935 | Krebs | 267/1 |
| 2,378,404 | 6/1945 | Grant, Jr. | 137/554 |
| 2,644,427 | 7/1953 | Sedgefield et al. | 251/129.04 |
| 3,129,722 | 4/1964 | Wagner | 137/554 |
| 3,630,643 | 12/1971 | Eheim | 123/357 |
| 3,923,475 | 12/1975 | Stenzel et al. | 137/554 |
| 4,212,279 | 7/1980 | Ohtani | 123/357 |
| 4,338,965 | 7/1982 | Garnjost et al. | 137/554 |

Primary Examiner—A. Michael Chambers

[57] ABSTRACT

The backlash spring of a fuel control linkage is enclosed by an elastomeric sleeve which absorbs the energy of multiple resonant modes stimulated in the spring by vibratory fields. Deflections of large amplitude in the spring are minimized thereby. The sleeve has a plurality of ribs which extend axially therein and which provide an interference fit with the coils of the spring. The sleeve ribs contact as many of the spring coils as possible but minimize interference of the sleeve with the motion of the spring during the normal articulation thereof.

8 Claims, 1 Drawing Sheet

VIBRATION DAMPER

DESCRIPTION

1. Technical Field

This invention relates to fuel control linkage systems and more particularly relating to a means for protecting fuel control linkage systems from excessive vibration.

2. Background Art

Some gas turbine fuel controls, as in hybrid or supervisory fuel control systems, require an interface between a hydromechanical portion of the fuel control and an electronic controller. The electronic controller may, via the interface, be continually apprised of the mass flow of fuel passing through the hydromechanical portion of the fuel control. Fuel flow to the gas turbine may be accurately controlled thereby.

Typically, a linkage system provides an interface between a hydromechanical metering valve and a position sensor. The position sensor provides feedback to the electronic controller as to the position of the metering valve via the linkage system. The electronic controller may then compute the mass fuel flow to the engine.

A linkage spring (i.e. a backlash spring) is generally utilized within the linkage system to minimize backlash therein. Backlash is typically defined as the play between adjacent moveable parts caused by machining tolerances, materials variations and the like. By minimizing the backlash of the linkage system (hereinafter "linkage"), the controller may be accurately apprised at all times of the position of the fuel metering valve.

Fuel controls for gas turbine engines may be subjected to vibratory fields. Vibratory fields can stimulate multiple resonant modes resulting in deflections of large amplitude in the linkage spring. Should the vibratory fields stimulate such deflections within the linkage spring, the spring may suffer fatigue and subsequent failure. As a result of a failure, the electronic controller may not be provided with accurate feedback as to the exact position of the fuel metering valve. Shutdown or overspeed of the engine may then occur.

DISCLOSURE OF THE INVENTION

It is therefore an object of the invention to provide accurate feedback to the electronic controller of a fuel control as to the position of a fuel metering valve even though vibratory fields may be encountered.

It is an object of the invention to minimize the effects of vibratory fields upon a fuel control linkage.

It is an object of the invention to minimize the effects of vibratory fields upon a backlash spring utilized by the fuel control linkage.

According to the invention, a backlash spring utilized in a fuel control linkage is enclosed by a close fitting elastomeric sleeve which absorbs the energy of multiple resonant modes stimulated in the spring by vibratory fields. Deflections of large amplitude in the spring are minimized thereby.

The sleeve has a plurality of ribs which extend axially therein and which provide an interference fit with the coils of the spring. The sleeve ribs contact as many of the spring coils as possible but minimize interference of the sleeve with the motion of the spring during the normal articulation thereof.

These and other objects, features, and advantages of the present invention will become more apparent in light of the detailed description of a best mode embodiment thereof, as illustrated in the accompany drawing.

BRIEF DESCRIPTION OF THE DRAWINGS

FIG. 1 is a perspective view, partly exploded and partly broken away, of a fuel control linkage employing the concepts of the invention; and FIG. 2 is a top view of the linkage of FIG. 1.

BEST MODE FOR CARRYING OUT THE INVENTION

Referring to the drawings, an electronic controller (not shown) receives feedback of the actual position of a fuel metering valve (shown partially at 10) to accurately meter fuel to a gas turbine engine (not shown). Typically, a linkage 12 is disposed between the fuel metering valve and a resolver 14. The linkage transmits the actual position of the fuel metering valve to the resolver which in turn sends an electronic signal to the controller. The controller is continually updated as to the actual position of the metering valve thereby.

The linkage 12, which is disposed within a housing 16, consists of several parts, as follows: a shaft 18, a follower arm 20, a segment gear 22, a adjustment lever 24, a backlash spring 26 and a sleeve 28.

The shaft 18, having a first end portion 30 and a second end portion 32, is mounted for rotation within the housing 16. The follower arm 20 is rigidly attached to the first end portion of the shaft. The second end portion of the shaft which mounts the segment gear 22 and the adjustment lever 24 thereon as will be discussed infra. A hole 34 extends through second end portion for mounting the adjusting lever thereto as will be discussed infra.

The segment gear 22 has a roughly cylindrical hollow body 36, a first spring seat arm 38 extending from the cylindrical body, a first segment 40 rigidly attached to the body, and a second segment 42 mounted for rotation about the body. A spring (not shown) is disposed within an internal chamber (not shown) between the two segments to load the second segment for rotation about the second end portion 32 relative to the first segment. Each segment has a plurality of gear teeth 44 for mating with a gear 46 attaching to the resolver 14.

The adjustment lever 24 has a roughly cylindrical hollow body 48 having an opening 50 extending therethrough. The opening is adapted to align with the hole 34 extending through the second end portion 32 of the shaft 18. A pin 52 extends through the opening and the hole to fix the adjustment lever to the shaft. A cotter pin 54 prevents the pin from disengaging from the hole and opening.

The adjustment lever 24 has an arm 56 extending therefrom which threadably engages a calibration screw 58 as will be discussed infra. The adjustment lever prevents the segment gear 22 from sliding off the second end 32 of the shaft 18.

The housing 16 has a roughly cylindrical opening 60 for housing the resolver 14 and a second cylindrical opening 62 for housing the shaft 18. A second spring seat arm 64 is attached to an upper surface 66 of the housing in close proximity to the first spring seat arm 38 of the segment gear 22 by screws 68.

Figures 1, 2:
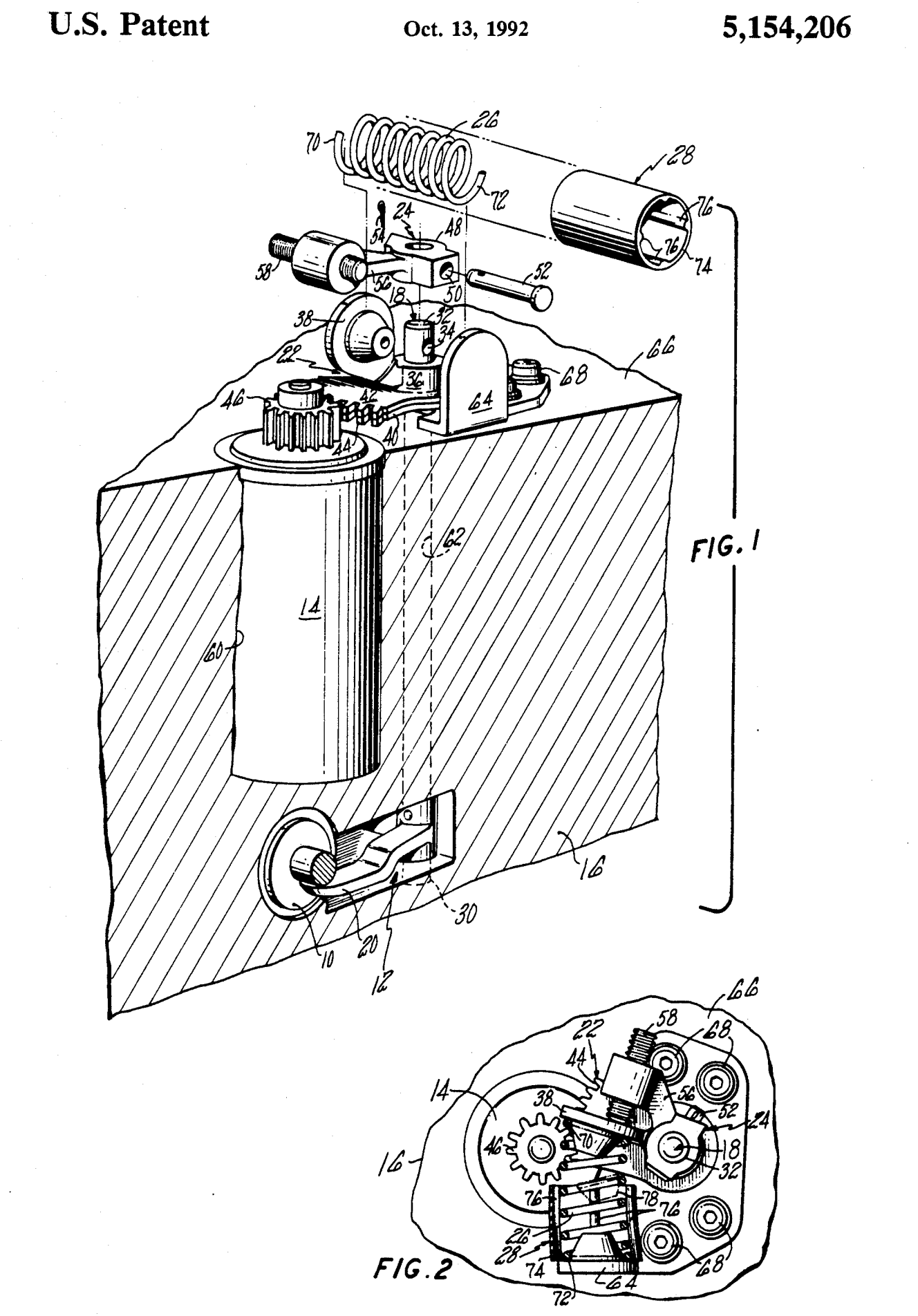

Referring to FIG. 2, the spring 26 is disposed, at its first end portion 70 to the first spring seat arm 38 and at its second end portion 72 to the second spring seat 64. The spring is constructed of an Armco 17-7 PH steel, has a spring force of approximately 4 ½ ± 1 pound, and has an outside diameter of 0.545 ± 0.010 inches.

The sleeve 28 is fitted about the outer diameter of the spring 26. The sleeve is characterized by a relatively thin, body portion 74 which has a plurality of ribs 76 extending axially along the length of the body portion. The body portion and the ribs are constructed of a temperature-resistant elastomeric material such as a fluorosilicone.

In operation, the metering valve 10, as shown in FIG. 1, translates into and out of the housing 16. The follower arm 20 moves with the metering valve forcing the shaft 18 to rotate within the housing. The rotational movement of the shaft rotates the segments 40, 42 which in turn rotate the gear 46 of the resolver 14. Because the segments are spring loaded against each other, the teeth of the segments pinch the teeth of the gear 46. By pinching the gear teeth, tolerances between the teeth 44 of the segments and the teeth of the gear 46 are minimized. The spring 26 forces the follower arm 20 (via the shaft 18) against the metering valve 10 during the entire stroke thereof. By forcing contact with the metering valve, backlash of the linkage is minimized.

The ribs 76 of the sleeve 28 provide diametrial interference with the outer diameter of the the spring. The diametrial interference is from about 0.005 inches minimum to about 0.060 inches maximum. The axial length of the sleeve is less than the compressed minimum operating length of the spring. The minimum operating length is suggested in FIG. 2 by the first spring seat arm 30 shown in phantom as 78. The sleeve contacts as many of the spring coils as possible within the minimum operating length thereof. The diametrial interference of the ribs with the spring ensures contact therewith while avoiding pinching the body of the sleeve between adjacent coils of the spring.

The ribs 76 increase the local stiffness of the sleeve but are not so stiff to prevent articulation of the sleeve 28 with the bending of the spring 26. The ribbed interior diameter accommodates a wide variation of spring sizes with minimum variation in spring/sleeve contact force. Because the spring contacts the ribs of the sleeve and generally not the body portion thereof, the probability of damage to the sleeve by pinching is minimized.

The relatively thin body portion 74 allows conformance of the sleeve 28 to the spring 26 during installation and during articulation of the spring as one spring seat moves towards and away from the other spring seat. The flexible nature of the sleeve material allows the sleeve to conform to the natural static shape assumed by the spring with a minimum of interference to spring function as the spring moves through its operating range in service. The cylindrical shape of the sleeve is simple and inexpensive to manufacture and permits easy installation.

The sleeve functions by absorbing a significant amount of energy imparted to the spring coils by the vibratory field. A gross reduction in the amplitude of spring motion results in a corresponding reduction of the cyclic stressing of the spring. Spring life is enhanced thereby and the controller may receive accurate feedback as to the position of the metering valve 10 for longer periods of time.

Although the invention has been shown and described with respect to a best mode embodiment thereof, it should be understood by those skilled in the art that the foregoing and various other changes, omissions, and additions in the form and detail thereof maybe made therein without departing from the spirit and scope of the invention.

We claim:

1. A fuel control linkage for providing an interface between a fuel metering valve and a feedback device so that the feedback device may provide information as to the position of the metering valve to an electronic controller, said linkage comprising;
   translation means for transmitting a position of said metering valve to said feedback device,
   a spring for urging said translation means against said metering valve to minimize backlash within said linkage, and
   a sleeve disposed about said spring and having a diametral interference fit therewith, said sleeve absorbing energy of a resonant mode stimulated in the spring by a vibratory field.

2. A fuel control linkage for providing an interface between a fuel metering valve and a feedback device so that the feedback device may provide information as to the positoin of the metering valve to an electronic controller, said linkage comprising;
   translation means for transmitting a position of the metering valve to the feedback device,
   a spring for urging said translation means against said metering valve to minimize backlash within the linkage,
   a sleeve disposed about said spring and having a diametral interference fit therewith, said sleeve absorbing energy of a resonant mode stimulated in the spring by a vibratory field, wherein said sleeve is further characterized by;
   a hollow body conforming to a static shape of said spring, said body having an interior diameter greater than an exterior diameter of said spring, and
   a plurality of ribs disposed along a length of an interior diameter of said body, said ribs interfering with said external diameter of said spring.

3. The linkage of claim 2 wherein said sleeve is further characterized as being constructed of an elastomeric material.

4. The linkage of claim 2 wherein said length of said sleeve is characterized as being less than a minimum operating length of said spring.

5. The linkage of claim 1 wherein a length of said sleeve is characterized as being less than a minimum operating length of said spring.

6. Apparatus for minimizing the effects of a vibratory field upon a spring characterized by:
   a sleeve disposed about said spring and having a diametral interference fit therewith, said sleeve absorbing energy of a resonant mode stimulated in the spring by the vibratory field, said sleeve comprising:
   a hollow body conforming to a static shape of said spring, said body having an interior diameter greater than an exterior diameter of said spring, and
   a plurality of ribs disposed along a length of an interior diameter of said body, said ribs interfering with said external diameter of said spring.

7. The linkage of claim 6 wherein said sleeve is further characterized as being constructed of an elastomeric material.

8. The linkage of claim 6 wherein said length of said sleeve is characterized as being less than a minimum operating length of said spring.

* * * * *